US011965376B2

(12) United States Patent
Narayanappa et al.

(10) Patent No.: US 11,965,376 B2

(45) Date of Patent: Apr. 23, 2024

(54) HINGED DOOR OPEN PLUNGER

(71) Applicant: Bell Textron Inc., Fort Worth, TX (US)

(72) Inventors: Savithramma Narayanappa, Bangalore (IN); Vitthal Vishnuthreeth Arakeri, Bangalore (IN); Bobby Howard Mosier, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/676,537

(22) Filed: Feb. 21, 2022

(65) Prior Publication Data

US 2023/0265702 A1 Aug. 24, 2023

(51) Int. Cl.

*E05F 5/06* (2006.01)
*E05C 17/20* (2006.01)
*E05D 5/06* (2006.01)
*E05D 11/10* (2006.01)

(52) U.S. Cl.

CPC .............. *E05F 5/06* (2013.01); *E05C 17/203* (2013.01); *E05D 5/062* (2013.01); *E05D 11/1085* (2013.01); *E05Y 2900/531* (2013.01)

(58) Field of Classification Search

CPC ....... E05F 5/06; E05F 5/08; E05F 5/10; E05F 5/02; E05F 5/022; E05F 5/025; E05F 5/027; E05F 5/04; E05F 2005/043; E05F 2005/046; E05F 3/221; E05D 5/062; E05D 11/10; E05D 11/1007; E05D 11/1014; E05D 11/1085; E05C 17/04; E05C 17/045; E05C 17/08; E05C 17/085; E05C 17/18; E05C 17/20; E05C 17/203; E05C 17/206; E05C 17/22; E05C 17/24; E05C 17/26; E05C 17/28; E05C 17/30; E05C 17/32; E05C 17/34; E05C 17/346; E05C 17/44; E05C 17/446; E05C 17/46; E05C 17/48; E05C 17/50; E05C 17/505; E05C 17/52

See application file for complete search history.

(56) References Cited

U.S. PATENT DOCUMENTS 103,795 A * 5/1870 Struck ..................... E05D 11/00 16/343
119,944 A * 10/1871 Oats ........................ E05D 11/00 296/57.1
868,559 A * 10/1907 Heitzenrater ....... E05D 11/1014 16/332
980,686 A * 1/1911 Shine .................. E05D 11/1014 16/332
1,614,071 A * 1/1927 Klohn ................. E05D 11/1007 16/334

(Continued)

*Primary Examiner* — Jeffrey O'Brien

(74) *Attorney, Agent, or Firm* — Akona IP PC

(57) ABSTRACT

Disclosed is an assembly and a vehicle and apparatus including the assembly, for maintaining a vehicle door in an open position may include at least one rod member configured to connect at a first end to the door and at a second end to a vehicle frame. A tab may be connected to and extend in at least one direction from the rod member. A plunger may be configured to be anchored in the door and including a pin configured to extend from and retract into the plunger. The pin may be configured to engage the tab when extended and disengage from the tab when retracted.

20 Claims, 7 Drawing Sheets

(56) References Cited

U.S. PATENT DOCUMENTS 1,683,814 A * 9/1928 Block ..................... E05D 11/06 16/353
1,966,205 A * 7/1934 Johnson .................. E05C 17/32 217/60 E
1,967,592 A * 7/1934 Rawlings ................ E05C 17/32 292/277
2,215,606 A * 9/1940 Dunn ........................ E05D 3/16 180/69.21
2,843,873 A * 7/1958 Slower .................... E05D 11/06 16/331
2,966,697 A * 1/1961 Mintz ................. E05D 11/1078 16/332
3,174,179 A * 3/1965 Benson ..................... E05F 5/06 16/86 A
3,629,900 A * 12/1971 Beerli, Jr. ........... E05D 11/1007 16/349
3,744,085 A * 7/1973 Griego ................ E05D 11/1007 16/386
3,874,029 A * 4/1975 McCullough ....... E05D 11/1007 16/329
4,566,150 A * 1/1986 Boothe ..................... E06C 1/32 16/349
4,726,146 A * 2/1988 Opsahl .................. B64C 1/1407 16/349
4,872,239 A * 10/1989 Ferguson .................. E05F 5/02 16/64
5,016,317 A * 5/1991 Hung ...................... E05F 3/108 16/61
5,143,468 A * 9/1992 Pausch .................... F16C 11/10 16/322
5,335,396 A * 8/1994 Dolan ..................... E05C 17/30 292/262
5,659,925 A * 8/1997 Patterson ................ E05C 17/30 16/84
5,842,255 A * 12/1998 Luca ....................... E05F 3/108 16/49
5,865,480 A * 2/1999 Bain, Jr. ................. E05C 17/04 292/109
5,906,026 A * 5/1999 Junttila ................... E05F 3/221 16/85
6,634,627 B1 * 10/2003 Stevenson ............... F16F 9/585 188/300
7,103,938 B2 * 9/2006 Bruckner ............ E05D 11/1085 16/334
7,134,168 B1 * 11/2006 Qing ....................... E05F 3/221 16/80
7,216,400 B2 * 5/2007 Hodson ................... E05F 3/221 16/66
7,497,490 B2 * 3/2009 Yamaguchi ............. E05C 17/30 292/259 R
8,443,488 B2 * 5/2013 Zhang ..................... E05F 3/221 16/65
8,695,163 B2 * 4/2014 Roberts ................... E05F 3/221 16/49
8,695,164 B2 * 4/2014 Chinta ................ E05B 63/0056 16/86 C
8,713,756 B2 * 5/2014 Wu ......................... E05F 3/221 16/80
9,822,570 B2 * 11/2017 Jaranson ................... E05F 1/10
10,006,237 B1 * 6/2018 Qiu ......................... E05F 5/027
10,107,020 B2 * 10/2018 Seki .................... E05B 63/0056
10,329,810 B2 * 6/2019 Kamata ................. E05C 17/203
10,415,280 B2 * 9/2019 Freedman ............. E05C 17/206
11,131,129 B2 * 9/2021 Westgarth ............. E05C 17/203
2007/0003361 A1 * 1/2007 Wang ...................... F16B 7/105 403/109.3
2015/0204130 A1 * 7/2015 Vojtisek .................. E05F 5/025 16/64
2022/0025684 A1 * 1/2022 Kroll ....................... E05C 17/36
2022/0412141 A1 * 12/2022 Rojas ...................... E05D 5/062

* cited by examiner

HINGED DOOR OPEN PLUNGER

CROSS REFERENCE TOR ELATED APPLICATIONS

Not applicable.

STATEMENT REGARDING FEDERALLY SPONSORED RESEARCH OR DEVELOPMENT

Not applicable.

TECHNICAL FIELD OF THE DISCLOSURE

The present disclosure relates, in general, to an emergency hold open feature for a hinged door of a vehicle.

BACKGROUND

Many vehicles are provided with access doors such as a hood, passenger door, hatchback, or truck bed topper door which is raised or otherwise opened to provide access to the engine compartment, truck bed, or interior of the vehicle. Some of these vehicles' access doors are also equipped with a hydraulic cylinder and rod combination, known as a gas prop or strut, that is designed to hold the access door in its fully open position. Specifically, these gas props are intended to provide sufficient resistance to the weight of the access door to prevent gravity, wind or some other force from causing the access door to drop or otherwise close; however, this resistance can be overcome by manually applying additional force to the access door to thereby close it.

In emergency evacuation situations, it may be necessary to ensure that a door remains open against wind forces so that people can safely exit a vehicle or other enclosure. Wind forces, for example, can result in forces as high as five hundred pounds across a surface of a door. Gas props should, therefore, be able to withstand such forces or be assisted by other mechanisms that prevent doors from overcoming the resistive force of a gas prop.

Accordingly, it is desirable to provide a system that mitigates the failure of the gas props used to support access doors.

SUMMARY

An implementation for an assembly for maintaining a vehicle door in an open position may include at least one rod member configured to connect at a first end to the door and at a second end to a vehicle frame. A tab may be connected to and extend in at least one direction from the rod member. A plunger may be configured to be anchored in the door and include a pin configured to extend from and retract into the plunger. The pin may be configured to engage the tab when extended and disengage from the tab when retracted.

The rod member may include a telescoping rod member, which may be a pneumatic cylinder. The pin and the tab may be configured to withstand at least five hundred pounds of shear force applied via the door when the pin engages the tab. The at least one rod member may be configured to withstand at least five hundred pounds of force applied to the at least one rod member via the door. The pin is configured to extend in response to an axial force applied to the plunger. The vehicle door may be a rotorcraft vehicle door.

A further implementation may be a vehicle including a vehicle frame, a vehicle door, and an assembly for maintaining the door of the vehicle in an open position. The assembly for maintaining the door of the vehicle in an open position may include at least one rod member configured to connect at a first end to the door and at a second end to the vehicle frame, a tab connected to and extending in at least one direction from the rod member, and a plunger configured to be anchored in the door. The plunger may include a pin configured to extend from and retract into the plunger. The pin may be configured to engage the tab when extended and disengage from the tab when retracted.

The rod member may include a telescoping rod member, which may be a pneumatic cylinder. The pin and the tab may be configured to withstand at least five hundred pounds of shear force applied via the door when the pin engages the tab. The at least one rod member may be configured to withstand at least five hundred pounds of force applied to the at least one rod member via the door. The pin is configured to extend in response to an axial force applied to the plunger. The vehicle door may be a rotorcraft vehicle door.

A yet further implementation may be an apparatus including a vehicle door and an assembly for maintaining the door of the vehicle in an open position. The assembly may include at least one rod member configured connected at a first end to the door and at a second end to the vehicle frame, a tab connected to and extending in at least one direction from the rod member, and a plunger anchored in the door. The plunger may include a pin configured to extend from and retract into the plunger. The pin may be configured to engage the tab when extended and disengage from the tab when retracted.

The rod member may include a telescoping rod member, which may be a pneumatic cylinder. The pin and the tab may be configured to withstand at least five hundred pounds of shear force applied via the door when the pin engages the tab. The at least one rod member may be configured to withstand at least five hundred pounds of force applied to the at least one rod member via the door. The pin is configured to extend in response to an axial force applied to the plunger. The vehicle door may be a rotorcraft vehicle door.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
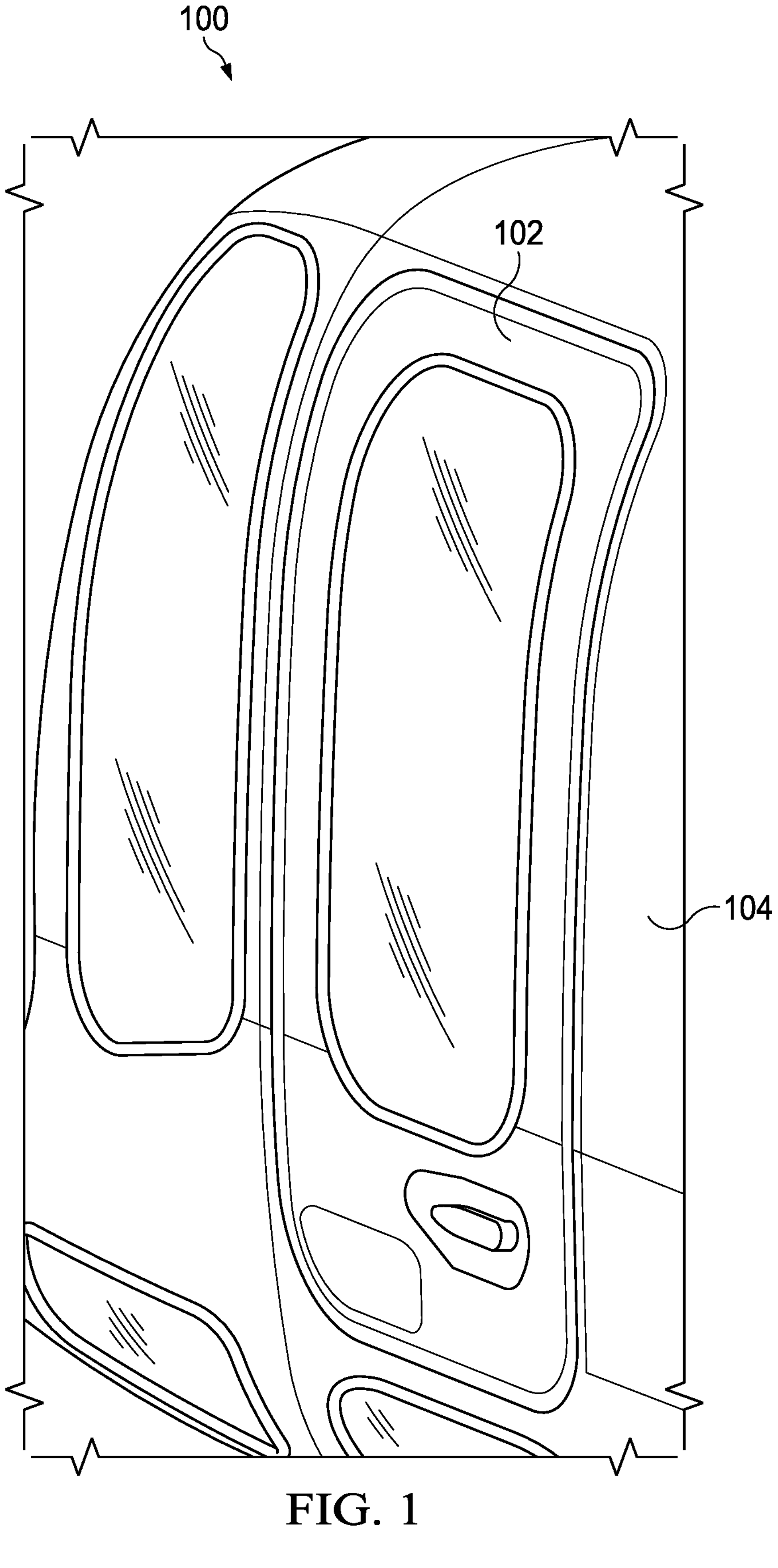
FIG. 1 illustrates a rotorcraft vehicle frame and a vehicle door in a closed configuration.

FIG. 1 illustrates a perspective view of a vehicle 100. The vehicle 100 may include a door 102 and a vehicle frame 104.

The door 102 is illustrated in a closed configuration. The vehicle 100 may be an airborne vehicle such as a helicopter or any other type of airborne vehicle. The vehicle may also be a land or sea based vehicle. Further, implementations of the present subject matter may be useful in structural environments such as buildings, bridges and tunnels.

The vehicle frame 104 is not necessarily limited to an element such as a chassis or traditional frame on which a vehicle body is mounted. For purposes of the present disclosure, the term vehicle frame may include a traditional vehicle frame, a vehicle body or any other element of a vehicle other than the vehicle door 102.

Figure 2A:
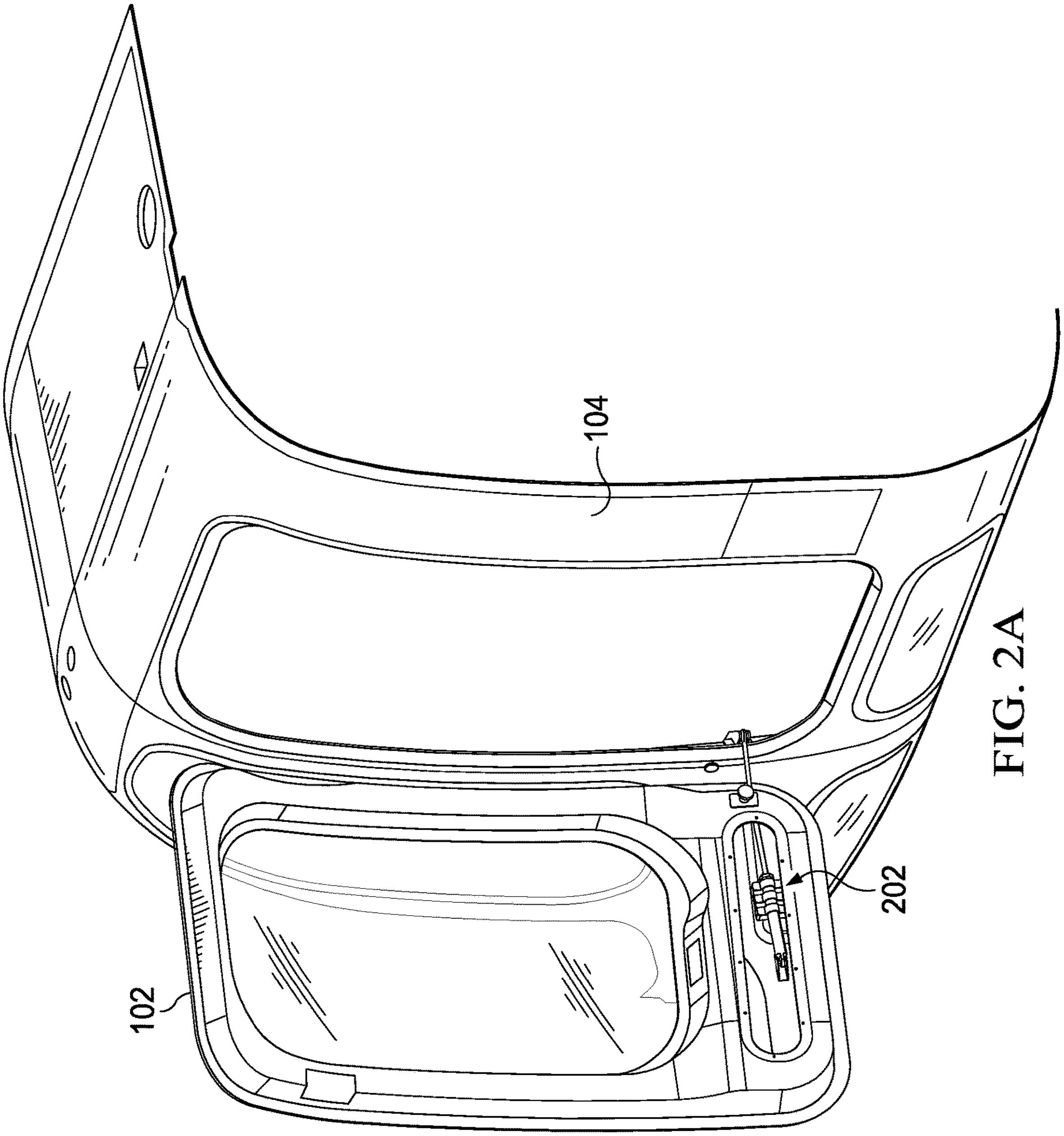
FIG. 2A illustrates the vehicle door of FIG. 1 in an opened configuration.
Figure 2B:
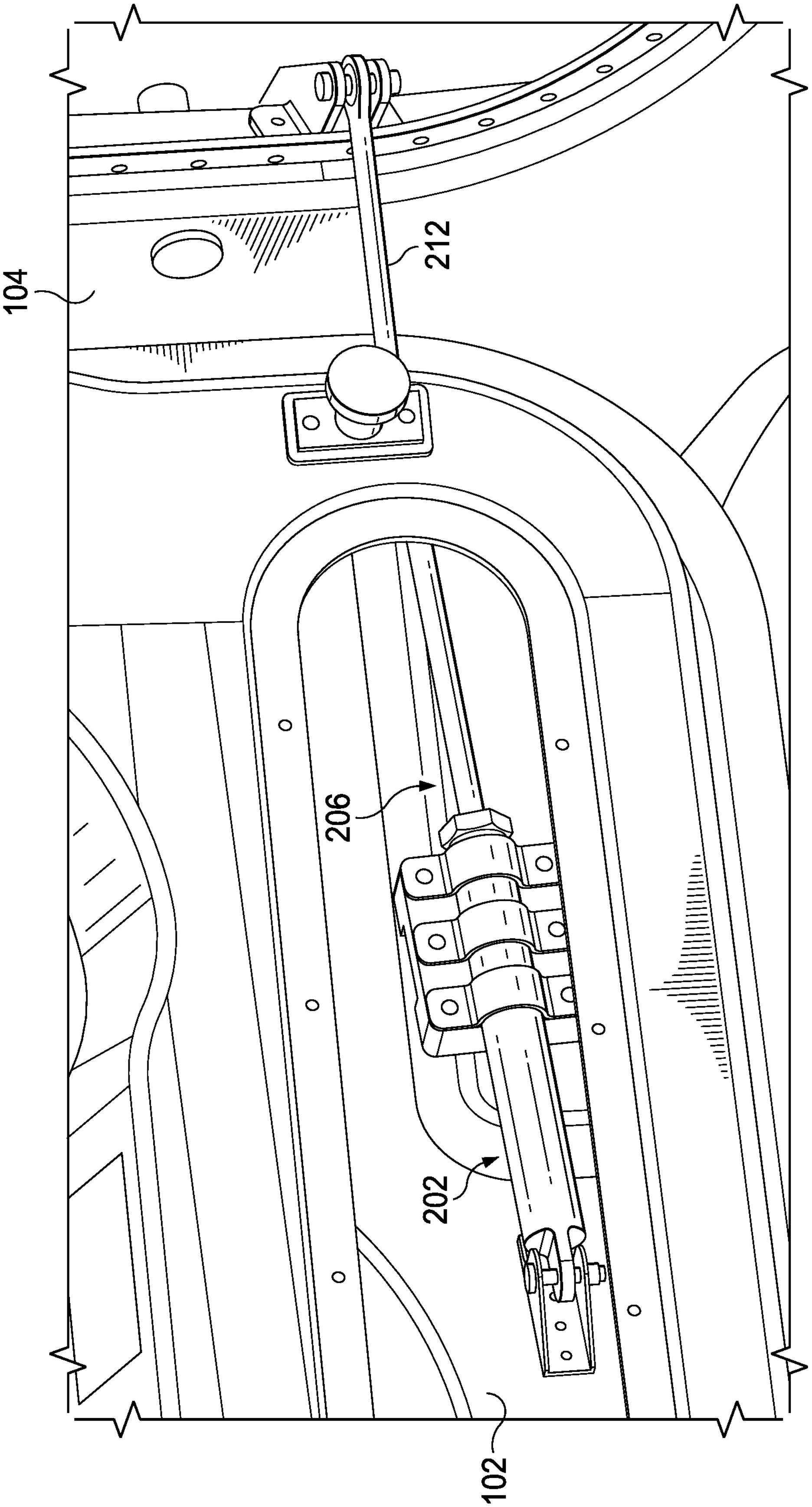
FIG. 2B illustrate a link within the vehicle with the door of FIG. 1.

FIGS. 2A and 2B illustrate a perspective view of the vehicle 100 with the door 102 in an open configuration. The open configuration of the door 102 may provide visibility of a link 202. Link 202 may extend from the door 102 to the frame 104 when the door 102 is in an open configuration and when the door 102 is in a closed configuration. The door 102 may be open to at least ninety degrees relative to the frame 104. In the present implementation, the link 202 may be a pneumatic cylinder.

Figure 2C:
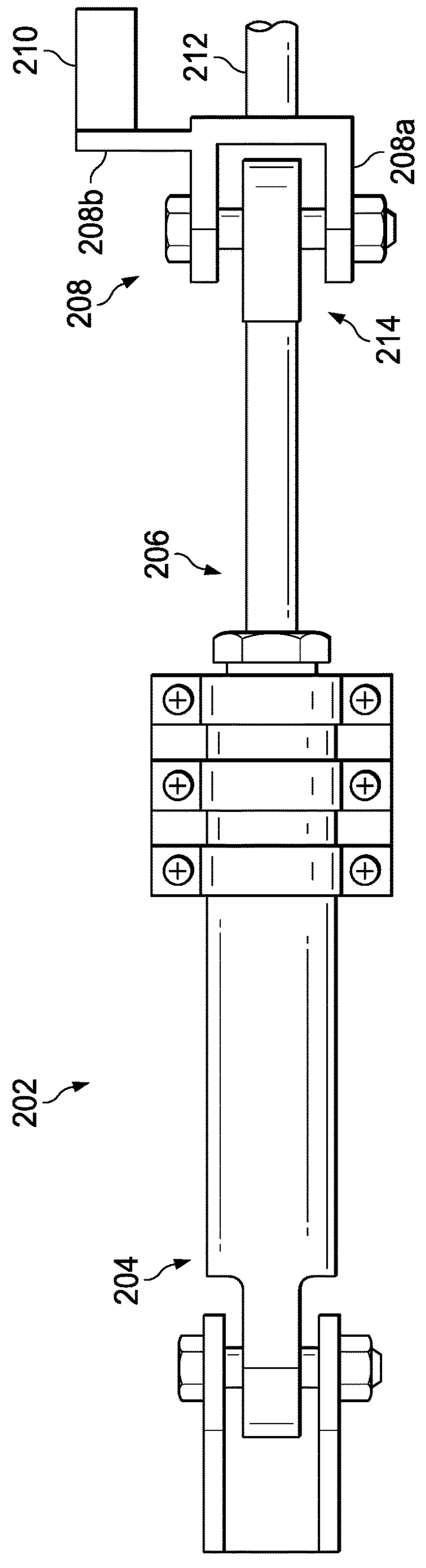
FIG. 2C illustrates the link of FIG. 2B.

FIG. 2C illustrates the link 202. The link 202 may include a first end 204 and a second end 206. The link 202 may be a telescoping member in which the first end 204 is coaxial with the second end 206. The first end 204 may be alternatively referred to as a base and the second end 206 may be alternatively referred to as a piston. The second end 206 may be a telescoping member that is received within the first end 204 when the link 202 is in a retracted position and slides from the first end 204 when the link 202 is in an extended position.

The link 202 may be a pneumatic cylinder that can withstand at least five hundred pounds of compressive force along its longitudinal axis when in an extended configuration thereby resisting collapse of the second end 206 into the first end 204. Therefore, when the door 102 is in an open configuration, the link 202 may help to prevent closure of the door when as much as five hundred pounds of force are applied to the link 202 via the door 102. The link 202 is not limited to a pneumatic link and may instead be a mechanical link, e.g., a ratcheted link or a non-pneumatic telescoping cylinder.

A tab 208 may be pivotably connected to a terminal end 214 of the second end 206. The tab 208 may include a body portion 208*a* and a tongue portion 208*b*. The tongue portion 208*b* may be thinner than the body portion 208*a*. However, the tongue portion 208*b* is not so limited and may be the same thickness as the body portion 208*a*. The tab 208 may be allowed to pivot in at least one angular direction about the terminal end 214 of the second end 206 to provide at least one respective degree of freedom for the link 202 when the door 102 is reconfigured between an opened position and a closed position and vice versa. The degree of freedom may allow the second end 206 to pivot relative to the vehicle frame 104.

The second end 206 may be connected to the vehicle frame 104 by a tie rod 212. The second end 206 may be allowed to pivot at its connection to the tie rod 212 and the tie rod 212 may be allowed to pivot at its connection to the vehicle frame 104. The tab 208 may be located at the connection between the second end 206 and the tie rod 212. Therefore, the tab 208 may be at a joint between the second end 206 and the tie rod 212.

It is not necessary that the tab 208 be at the end region of the second end 206. For example, if the second end 206 is coupled at one of its ends directly to the first end 204 and to the frame 104 at an opposing one of its ends, the tab 208 may be fixedly connected to the second end 206. In such an implementation, the tab 208 may be welded to the second end 206 or formed as a monolith.

Figure 3A:
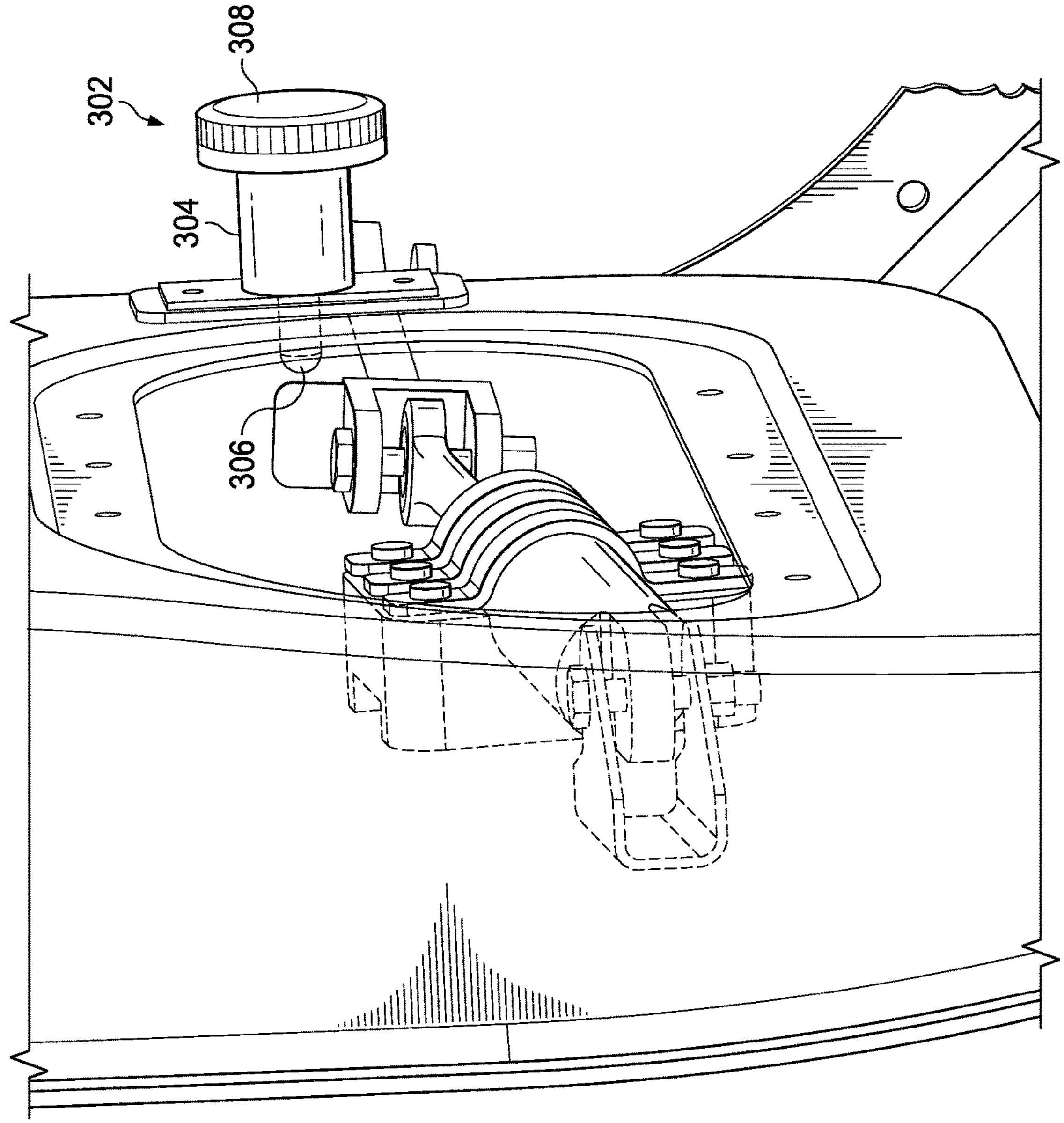
FIG. 3A illustrates the link of FIG. 2B and a plunger in a disengaged configuration.
Figure 3B:
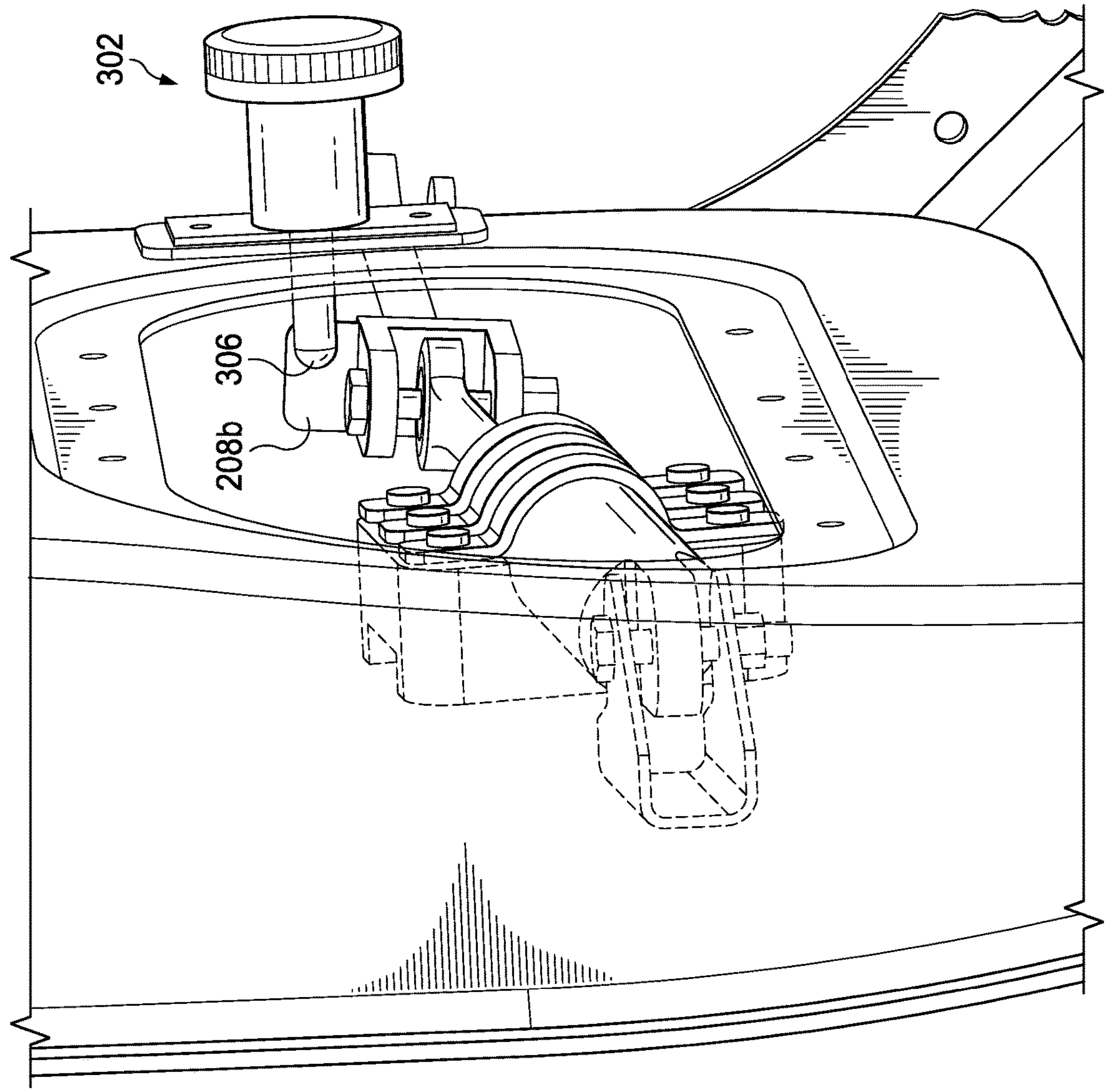
FIG. 3B illustrates the link of FIG. 3A and the plunger of FG. 3A in an engaged configuration.

FIG. 3A illustrates a plunger assembly 302 in an unengaged configuration and FIG. 3B illustrates the plunger assembly 302 in an engaged configuration. The engaged configuration may be one in which the door 102 is locked in the open configuration. The unengaged configuration is one in which the door 102 may be allowed to open or close without interference from the plunger assembly 302. The plunger assembly 302 may be connected to the door 102 and configured to engage the tab 208. The plunger assembly 302 may include a body 304, a pin 306 and a handle 308. The plunger pin 306 may be configured to extend from the plunger body 304 and retract into the plunger body 304.

The plunger pin 306 may remain retracted within the plunger body 304 by a spring, pin, or threaded means. Similarly, the plunger pin 306 may remain extended by a spring, pin, or threaded means. To reconfigure the plunger pin 306 from a retracted position to an extended position, the handle 308 may be rotated a minimum amount (for example, between 15 and 120 degrees) about a longitudinal axis of the plunger body 304. To retract the plunger pin 306 to its retracted position within the plunger body 304, the plunger handle 308 may be pulled away from the door 102 a minimum amount in a direction parallel to the longitudinal axis of the plunger body 304.

FIG. 3B illustrates the plunger pin 306 engaging the tongue portion 208*b*. If an emergency egress operation from the vehicle 100 is necessary, the plunger pin 306 may engage the tongue portion 208*b*. The plunger pin 306 may prevent the second end 206 of the link 202 from retracting into the first end 204 of the link 202. Therefore, the link 202 is allowed to remain in an extended configuration and the door 102 remains in an open configuration.

The plunger assembly 302 may be spring loaded so that the plunger pin 306 is configured to extend after the door 102 is opened from the frame 104 beyond a minimum degree. For example, the plunger pin 306 may be in a biased position in the extended direction. A mechanism 210 (shown in FIG. 2C) such as for example, a plate, may be added to the tab tongue portion 208*b* so that the plunger pin 306 engages the mechanism 210 and is thereby prevented from extension until the door 102 is opened wide enough that the plunger pin 306 disengages the mechanism 210.

The tab 208 and the plunger pin 306 are both made of material strong enough, e.g., steel, aluminum, etc., so that each of the tab 208 and plunger pin 306 can withstand a shear force of at least five hundred pounds. Accordingly, a force acting on the door 102 when the door 102 is in an open configuration such as wind, water, extraneous debris, etc., would not likely cause the vehicle door 102 to inadvertently close during emergency egress from the vehicle 100.

The link 202 may be at a front, lower portion of the door 102 toward a lower region of the vehicle 100. Correspondingly, the plunger assembly 302 may be at a front, lower portion of the door 102 on an interior of the vehicle (i.e., in the vehicle's passenger compartment). Therefore, in an emergency situation, a passenger would not have to reach very far to activate the plunger assembly 302. Alternatively, the link 202 and plunger assembly 302 may be at or near an upper portion, a mid-portion, a rear portion (not shown), etc. of the door 102 if the type of vehicle is designed so that it is impossible to include the link 202 and/or plunger assembly 302 at or near the front, lower portion of the door 102.

The plunger assembly 302 is illustrated as having a cylindrical plunger pin 306. However, the plunger pin 306 is not limited to a cylindrical plunger pin 306, i.e., a pin with a circular cross-section. The plunger pin 306 may have any type of cross section without affecting operability of the plunger assembly 306.

Similarly, the tab 208 is illustrated as having a substantially planar a tongue portion 208*b*. It is not necessary that the tongue portion 208*b* be substantially planar. The tongue portion 208*b* may be a pin, a recess defined by the second end 206 or defined by the body portion 208*a*, or some other form configured to physically engage the plunger pin 306 without shearing.

Figure 4A:
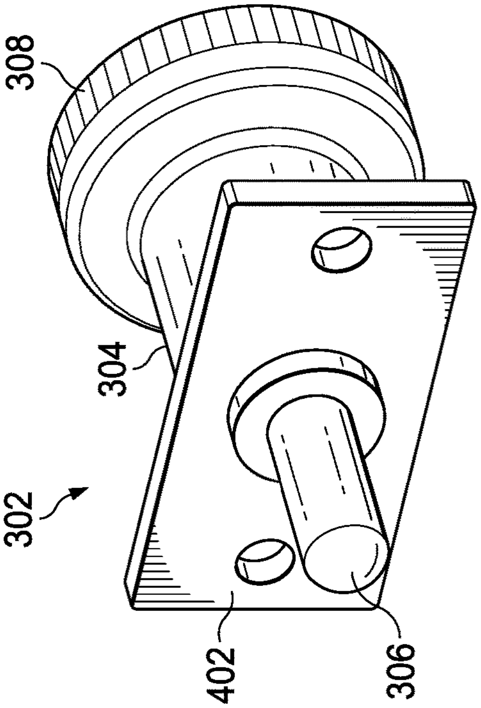
FIG. 4A illustrates a plunger assembly.
Figure 4B:
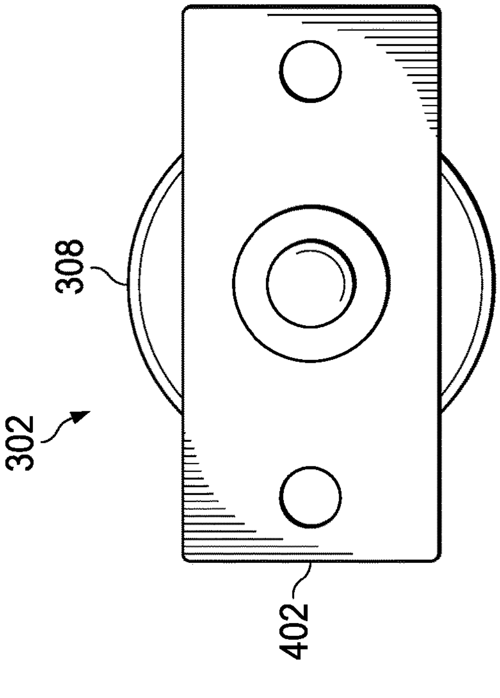
FIG. 4B illustrates a plan view of the plunger assembly of FIG. 4A.
Figure 4C:
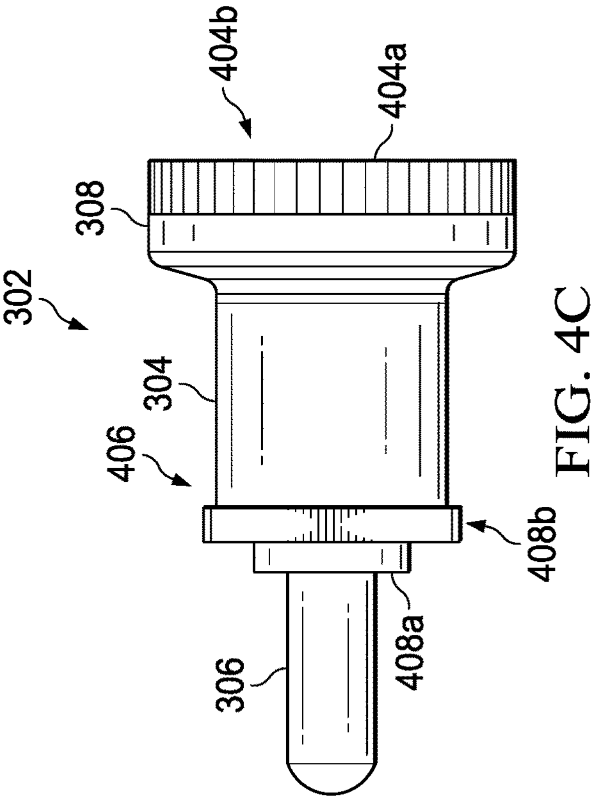
FIG. 4C illustrates an elevation view of the plunger assembly of FIG. 4B.

FIGS. 4A-4C illustrate the plunger assembly 302. The plunger assembly 302 may include the plunger body 304, the plunger pin 306, the plunger handle 308 and an anchoring bracket 402. The plunger handle 308 may be at a proximal end 404*a* of the plunger assembly 302 or proximal end region 404*b* of the plunger assembly 302 and the bracket 402 may be at a mid-region 406 of the plunger assembly 302, which may coincide with a distal end 408*a* of the plunger assembly 302 or distal end region 408*b* of the plunger assembly 302. The anchoring bracket 402 may be a rigid material such as a metal, a rigid plastic, etc., and may be configured to fix the plunger assembly 302 to the vehicle door 102 by, for example, threaded fasteners, adhesives, welds, etc.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention is not limited to the implementations and illustrations contained herein but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential.

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementation.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An assembly for maintaining a vehicle door in an open position comprising:

at least one rod member configured to connect at a first end to the door and at a second end to a vehicle frame;

a tab connected to and extending in at least one direction away from the at least one rod member; and a plunger configured to be anchored in the door, the plunger extending longitudinally from an interior of the door to an exterior of the door and including a pin configured to extend from and retract into the plunger, the pin being configured to engage the tab when extended and disengage from the tab when retracted;

wherein the tab is configured to prevent the pin from engaging the tab until after the door is opened beyond a minimum degree.

2. The assembly as recited in claim 1, wherein the at least one rod member includes a telescoping rod member.

3. The assembly as recited in claim 2, wherein the at least one rod member is a pneumatic cylinder.

4. The assembly as recited in claim 1, wherein the pin and the tab are configured to withstand at least five hundred pounds of shear force applied via the door when the pin engages the tab.

5. The assembly as recited in claim 4, wherein the at least one rod member is configured to withstand at least five hundred pounds of force applied to the at least one rod member via the door.

6. The assembly as recited in claim 1, wherein the pin is configured to extend in response to an axial force applied to the plunger.

7. The assembly as recited in claim 1, wherein the vehicle frame is a rotorcraft vehicle frame.

8. A vehicle comprising: a vehicle frame;

a vehicle door;

an assembly for maintaining the door of the vehicle in an open position including:

at least one rod member configured to connect at a first end to the door and at a second end to the vehicle frame;

a tab connected to and extending in at least one direction away from the at least one rod member; and a plunger anchored in the door, the plunger extending longitudinally from an interior of the door to an exterior of the door, and including a pin configured to extend from and retract into the plunger, the pin being configured to engage the tab when extended and disengage from the tab when retracted;

wherein the tab is configured to prevent the pin from engaging the tab until after the door is opened beyond a minimum degree.

9. The vehicle as recited in claim 8, wherein the at least one rod member includes a telescoping rod member.

10. The vehicle as recited in claim 9, wherein the at least one rod member is a pneumatic cylinder.

11. The vehicle as recited in claim 8, wherein the pin and the tab are configured to withstand at least five hundred pounds of shear force applied via the door when the pin engages the tab.

12. The mechanism as recited in claim 11, wherein the at least one rod member is configured to withstand at least five hundred pounds of force applied to the at least one rod member via the door.

13. The vehicle as recited in claim 8, wherein the pin is configured to extend in response to an axial force applied to the plunger.

14. The vehicle as recited in claim 8, wherein the vehicle is a rotorcraft.

15. An apparatus comprising:

a vehicle door;

an assembly for maintaining the vehicle door in an open position including:

at least one rod member configured to be connected at a first end to the door and at a second end to a vehicle frame;

a tab connected to and extending in at least one direction away from the at least one rod member; and a plunger anchored in the door, the plunger extending longitudinally from an interior of the door to an exterior of the door, and including a pin configured to extend from and retract into the plunger, the pin being configured to engage the tab when extended and disengage from the tab when retracted;

wherein the tab is configured to prevent the pin from engaging the tab until after the door is opened beyond a minimum degree.

16. The apparatus as recited in claim 15, wherein the at least one rod member includes a telescoping rod member.

17. The apparatus as recited in claim 16, wherein the at least one rod member is a pneumatic cylinder.

18. The apparatus as recited in claim 15, wherein the pin and the tab are configured to withstand at least five hundred pounds of shear force applied via the door when the pin engages the tab.

19. The apparatus as recited in claim 15, wherein the pin is configured to extend in response to an axial force applied to the plunger.

20. The apparatus as recited in claim 15, wherein the vehicle door is a rotorcraft vehicle door.

* * * * *